United States Patent

Sakaguchi et al.

[11] Patent Number: 6,027,425
[45] Date of Patent: Feb. 22, 2000

[54] VEHICLE MOTIVE FORCE CONTROL SYSTEM

[75] Inventors: Shinichi Sakaguchi; Eisuke Kimura; Hiroyuki Abe; Makoto Kishida; Motoshi Ishikawa; Kazuhisa Yamamoto; Akihiro Yamamoto, all of Wako, Japan

[73] Assignee: Honda Giken Kogyo Kabushiki Kaisha, Tokyo, Japan

[21] Appl. No.: 09/221,858

[22] Filed: Dec. 29, 1998

[30] Foreign Application Priority Data

Jan. 9, 1998 [JP] Japan .................................. 10-015051

[51] Int. Cl.$^7$ ............................ B60K 41/12; B60K 41/04
[52] U.S. Cl. .................................. 477/48; 477/111; 701/58
[58] Field of Search ................................ 477/46, 48, 107, 477/110, 111; 701/58, 61

[56] References Cited

U.S. PATENT DOCUMENTS

| | | | |
|---|---|---|---|
| 4,507,986 | 4/1985 | Okamura et al. | 477/48 X |
| 4,699,025 | 10/1987 | Omitsu | 477/48 X |
| 4,720,793 | 1/1988 | Watanabe et al. | 477/48 X |
| 4,735,114 | 4/1988 | Satoh et al. | 477/48 X |
| 5,508,923 | 4/1996 | Ibamoto et al. | 701/58 X |
| 5,695,427 | 12/1997 | Sato et al. | 477/46 X |

FOREIGN PATENT DOCUMENTS

| | | |
|---|---|---|
| 63-232043 | 9/1988 | Japan . |
| 6-129273 | 5/1994 | Japan . |
| 6-65529 | 8/1994 | Japan . |
| 7-81535 | 3/1995 | Japan . |

*Primary Examiner*—Charles A Marmor
*Assistant Examiner*—Roger Pang
*Attorney, Agent, or Firm*—Nikaido, Marmelstein, Murray & Oram LLP

[57] ABSTRACT

A system for controlling motive force of a vehicle having an engine and a continuously variable automatic transmission connected to the engine to transmit engine torque to a drive shaft of the vehicle. In the system, a desired motive force is calculated or determined from the detected accelerator (pedal) position and vehicle speed, and based on the determined motive force a desired engine speed, more specifically a drive shaft speed of the transmission, is calculated or determined. Then inertia torque acting on the vehicle is calculated or determined based on at least the determined speed and detected speed, and a desired throttle opening is corrected by the determined inertia torque when the vehicle accelerates or decelerates. With the arrangement, the vehicle response delay due to the inertia torque is adjusted and hence, drivability and fuel economy performance are enhanced.

15 Claims, 7 Drawing Sheets

FIG. 8

VEHICLE MOTIVE FORCE CONTROL SYSTEM

BACKGROUND OF THE INVENTION

1. Field of the Invention

This invention relates to a motive force (power) control system for a vehicle equipped with an internal combustion engine and an automatic transmission, particularly to a vehicle motive force control system that optimizes vehicle fuel economy by integrated control of the engine and the automatic transmission.

2. Description of the Prior Art

In a motor vehicle equipped or configured according to the prior art, when the vehicle operator depresses the accelerator pedal to raise the engine speed so as to accelerate the vehicle, since the generated motive force is initially consumed to increase the inertia force (torque and moment) of the automatic transmission and the vehicle body, the motive force can not immediately be attained as desired. On the contrary, when the operator releases the pedal from the depressed position to decelerate the vehicle, since the inertia force does not decrease immediately, the motive force becomes larger than desired. These factors degrade not only fuel economy performance, but also drivability.

In order to solve this problem, Japanese Laid-Open Patent Application No. Sho 63(1988)-232,043 teaches controlling the gear ratio on the basis of predetermined characteristics satisfying an improvement of fuel economy and, if the accelerator pedal is depressed to accelerate, controlling the gear ratio without using the characteristics to determine the desired engine speed, thereby achieving smooth acceleration so as to faithfully meet the operator's desire. Moreover, Japanese Patent Publication No. Hei 6(1994)-65,529 and Japanese Laid-Open Patent Application No. Hei 6(1994)-129,273 propose limiting the engine output to absorb inertia torque during gear shifting.

The prior art mentioned in Japanese Laid-Open Patent Application No. Sho 63(1988)-232,043, is disadvantageous, however, in that it disregards fuel economy characteristics when the vehicle accelerates, degrading fuel economy performance. The prior art described in Japanese Patent Publication No. Hei 6(1994)-65529 and Japanese Laid-Open Patent Application No. Hei 6(1994)-129,273 limits the engine torque, not for improving fuel economy performance, but for reducing shock generated during gear shifting, and teaches nothing regarding adjustments for the response delay due to the inertia torque so as to enhance fuel economy performance and drivability during vehicle acceleration or deceleration.

SUMMARY OF THE INVENTION

This invention was accomplished for the purpose of overcoming the foregoing problems of the prior art and has as its object to provide a vehicle motive force control system configured to adjust for the response delay due to the inertia torque so as not to only enhance the drivability, but also to improve fuel economy performance during vehicle acceleration and deceleration.

The present invention achieves the first object by providing a system for controlling motive force of a vehicle having an engine and an automatic transmission connected to the engine to transmit engine torque to a drive shaft of the vehicle, comprising: operating condition detecting means for detecting operating conditions of the vehicle including at least an accelerator position and a vehicle speed, and operating conditions of the engine including at least an engine speed; desired motive force determining means for determining a desired motive force to be generated by the vehicle based at least on the detected accelerator position and vehicle speed; desired output calculating means for calculating a desired output of the engine and a manipulated variable to be supplied to the automatic transmission to achieve the determined desired motive force so as to minimize fuel consumption; desired engine speed calculating means for calculating a desired engine speed based on at least the calculated manipulated variable to be supplied to the automatic transmission; inertia torque calculating means for calculating an inertia torque acting on the vehicle based at least on the calculated desired engine speed, the detected engine speed and the manipulated variable to be supplied to the automatic transmission; engine output correcting means for correcting the calculated desired output of the engine based on at least the calculated inertia torque; actuator control means for controlling operation of an actuator which regulates the output of the engine in response to the corrected desired output of the engine; and shift control means for controlling a gear ratio of the automatic transmission in response to the calculated manipulated variable to be supplied to the automatic transmission.

BRIEF EXPLANATION OF THE DRAWINGS

These and other objects and advantages of the present invention will be made more apparent with the following description and drawings, in which.

DETAILED DESCRIPTION OF THE PREFERRED EMBODIMENTS

An embodiment of the invention will now be explained with reference to the attached drawings.

Figure 1:
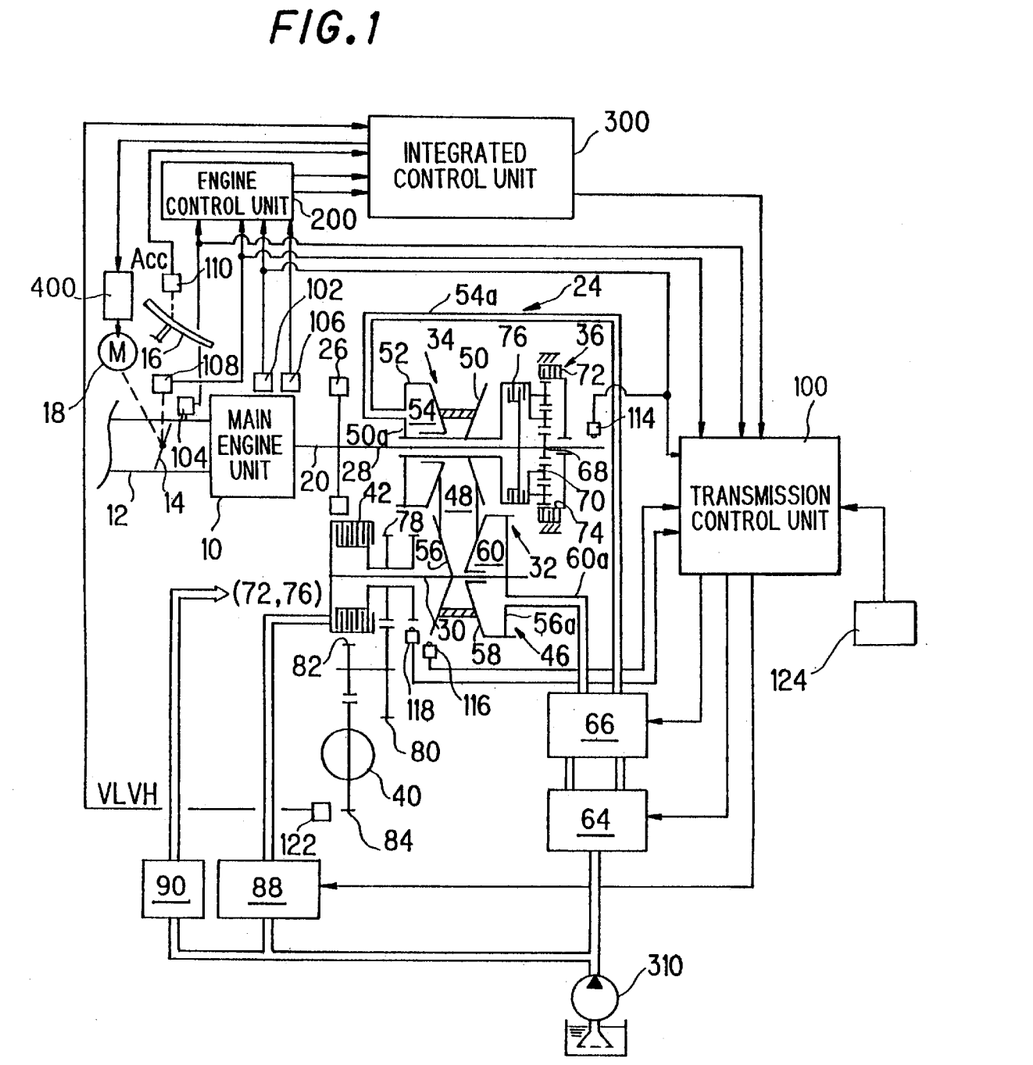
FIG. 1 is an overall schematic view of a vehicle motive force control system according to the present invention.

FIG. 1 is an overall schematic view of a vehicle motive force control system according to the invention. The automatic transmission in the illustrated embodiment is a belt-drive continuously variable transmission (CVT).

Reference numeral 10 in this figure designates an internal combustion engine, more precisely the main unit of the engine. A throttle valve 14 is installed in an air intake pipe 12 connected to the engine 10. The throttle valve 14 is not mechanically linked to an accelerator pedal 16 located on the floor of the vehicle near the operator's seat (not shown), but is connected to a stepper motor 18 and is opened and closed by the output of the stepper motor 18 connected therewith. The engine 10 is equipped with an EGR (exhaust gas recirculation) system (not shown).

The output shaft (crankshaft) 20 of the engine 10 is connected to a continuously variable transmission (CVT) 24. Specifically, an output shaft 20 of the engine 10 is connected through a dual-mass flywheel 26 to an input shaft 28 of the transmission 24.

The transmission 24 comprises a metal V-belt mechanism 32 located between the input shaft 28 and a counter-shaft 30, a planetary gear-type forward/reverse switching mechanism 36 located between the input shaft 28 and a drive-side movable pulley 34, and a start (drive-away) clutch 42 located between the counter-shaft 30 and a differential 40. Driving power transmitted to the differential 40 is transmitted to left and right drive wheels (not shown) through a drive shaft (not shown).

The metal V-belt mechanism 32 comprises the drive-side movable pulley 34 mounted on the input shaft 28, a driven-side movable pulley 46 mounted on the counter-shaft 30, and a metal V-belt 48 wound about the two pulleys. The drive-side movable pulley 34 comprises a fixed pulley half 50 mounted on the input shaft 28 and a movable pulley half 52 movable relative to the fixed pulley half 50 in the axial direction.

On the side of the movable pulley half 52 is formed a drive-side cylinder chamber 54, enclosed by a cylinder wall 50a and connected to the fixed pulley half 50. Oil pressure supplied to the drive-side cylinder chamber 54 through an oil line 54a produces lateral pressure for moving the movable pulley half 52 in the axial direction.

The driven-side movable pulley 46 comprises a fixed pulley half 56 mounted on the counter-shaft 30 and a movable pulley half 58 movable relative to the fixed pulley half 56 in the axial direction. On the side of the movable pulley half 58 is formed a driven-side cylinder chamber 60, enclosed by a cylinder wall 56a and connected to the fixed pulley half 56. Oil pressure supplied to the driven-side cylinder chamber 60 through an oil line 60a produces lateral pressure for moving the movable pulley half 58 in the axial direction.

A regulator valve group 64 is provided for determining pulley control oil pressure supplied to the drive-side cylinder chamber 54 and the driven-side cylinder chamber 60, and a shift control valve group 66 is provided for supplying the pulley control oil pressure to the cylinder chambers 54 and 60. The valve groups determine appropriate lateral pulley pressures, at which no V-belt 48 slip occurs, and vary the pulley width of the pulleys 34, 46 to vary the radius of the V-belt 48 wound about the pulleys 34, 46, thereby continuously varying the speed (gear) ratio.

The planetary gear-type forward/reverse switching mechanism 36 comprises a sun gear 68 connected to the input shaft 28, a carrier 70 connected to the fixed pulley half 50, a ring gear 74 that can be immobilized by a reverse brake 72, and a forward clutch 76 that can connect the sun gear 68 and the carrier 70.

When the forward clutch 76 engages, all gears rotate unitarily with the input shaft 28 to drive the drive-side movable pulley 34 in the same direction (forward) as the input shaft 28. When the reverse brake 72 engages, the ring gear 74 is immobilized so that the carrier 70 is driven reversely from the sun gear 68 and the drive-side movable pulley 34 is driven in the opposite direction (reverse) from the input shaft 28. When both the forward clutch 76 and the reverse brake 72 disengage, the transmission of power through the forward/reverse switching mechanism 36 is cut off and no power is transmitted between the engine 10 and the drive-side pulley 34.

The start clutch 42 is for ON/OFF (engage/disengage) control of power transmission between the counter-shaft 30 and the differential 40. When the start clutch 42 is made ON (engaged), the engine output varied in speed ratio by the metal V-belt mechanism 32 is transmitted through gears 78, 80, 82 and 84 to the differential 40, which divides and transmits it to the left and right drive wheels (not shown). When the start clutch 42 is made OFF (disengaged), the transmission assumes a neutral state.

The operation of the start clutch 42 is controlled by a clutch control valve 88, and the operation of the reverse brake 72 and the forward clutch 76 of the forward/reverse switching mechanism 36 is controlled by a manual shift valve 90 in response to the operation of a manual shift lever (not shown).

The valve groups are controlled based on control signals from a transmission control unit 100, comprised of a microcomputer.

A crank angle sensor 102 is provided at an appropriate location in the engine 10, such as near the cam shaft (not shown), and outputs a signal proportional to the crank angle (which is counted and used to calculate the engine speed NE). A manifold absolute pressure sensor 104 is installed in the air intake pipe 12 at an appropriate location downstream of the throttle valve 14 and outputs a signal proportional to the manifold absolute pressure PBA in the air intake pipe (the engine load). A coolant temperature sensor 106 is provided at an appropriate location on the cylinder block (not shown) and outputs a signal proportional to the engine coolant temperature TW.

A throttle position sensor 108 is installed near the throttle valve 14 and outputs a signal proportional to the throttle opening θTH and an accelerator position sensor 110 is provided near the accelerator pedal 16 and outputs a signal proportional to the accelerator (pedal) position ACC to which the operator has depressed the accelerator pedal 16.

In the transmission 24, a speed sensor 114 is provided near the input shaft 28 and outputs a signal proportional to the rotational speed NDR of the input shaft 28. A speed sensor 116 is provided near the driven-side movable pulley 46 and outputs a signal proportional to the rotational speed of the driven-side movable pulley 46, i.e., the rotational speed NDN of the input shaft of the drive-away clutch 42 (the counter-shaft 30). A speed sensor 118 is provided near the gear 78 and outputs a signal proportional to the rotational speed of gear 78, i.e., the rotational speed NOUT of the output shaft of the drive-away clutch 42.

A vehicle speed sensor 122 is provided near the drive shaft (not shown) connected to the differential 40 and outputs a signal proportional to the vehicle speed (road speed) VLVH. A shift lever position switch 124 is provided in the vicinity of the shift lever (not shown) installed on the vehicle floor near the operator's seat and outputs a signal proportional to the range position (D, N, P . . .) selected by the operator.

In addition to having the transmission control unit 100 mentioned earlier, the system is also equipped with an engine control unit 200 which is comprised of a microcomputer and an integrated control unit 300 which also is comprised of a microcomputer.

The outputs of the accelerator position sensor 110 and the vehicle speed sensor 122 are sent to the integrated control unit 300. The outputs of the other sensors are sent to the transmission control unit 100 and/or the engine control unit 200. The integrated control unit 300 is connected to the transmission control unit 100 and the engine control unit 200 and is supplied with necessary parameters including the outputs of the other sensors.

The integrated control unit 300 calculates or determines a desired throttle opening (manipulated variable) and a desired speed (gear) ratio and outputs the same to a throttle control unit 400 and the transmission control unit 100 such that the transmission 24 and the stepper motor 18 are controlled such that the respective desired values are effected or realized.

Figure 2:
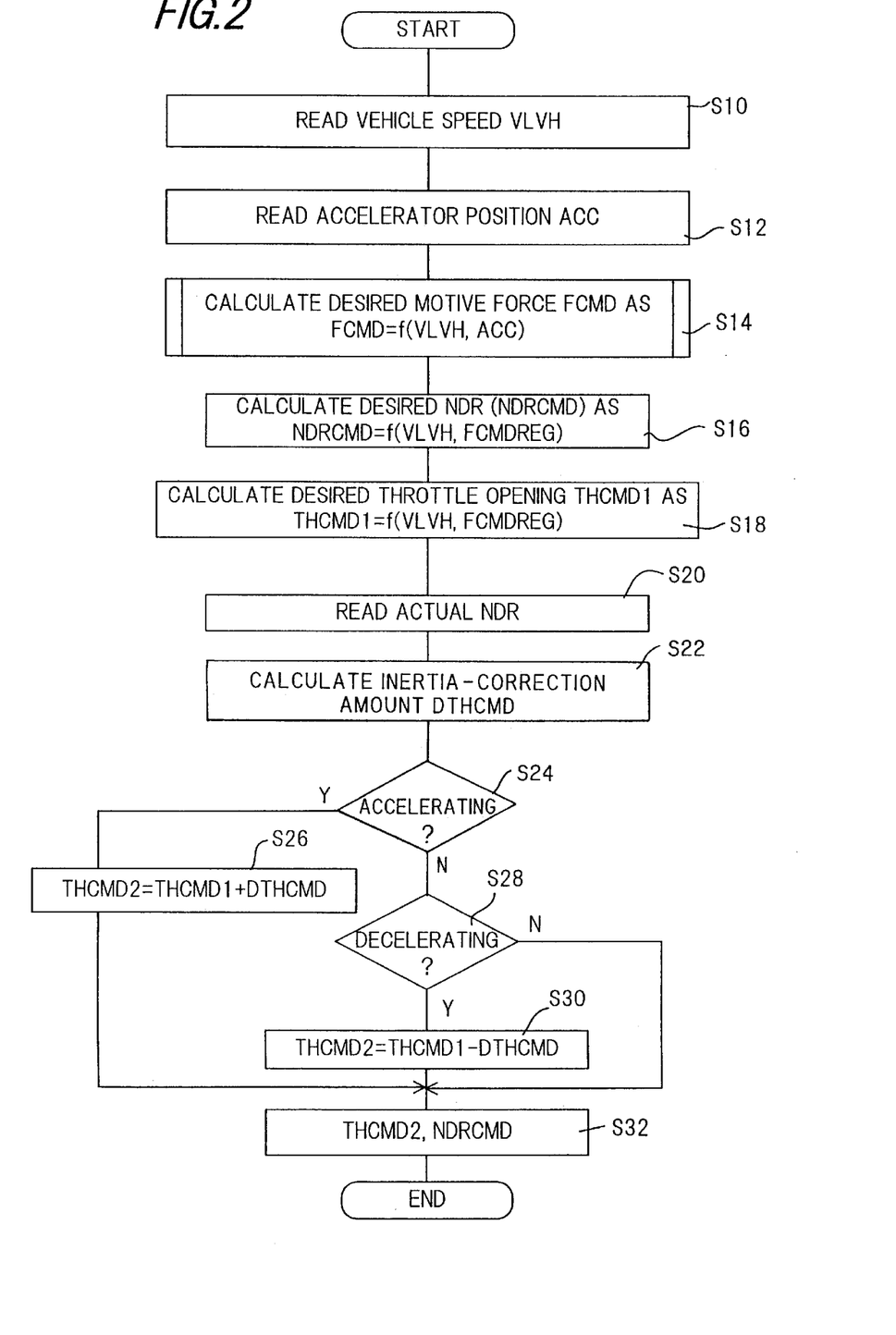
FIG. 2 is a flow chart showing the operation of the system illustrated in FIG. 1.
Figure 3:
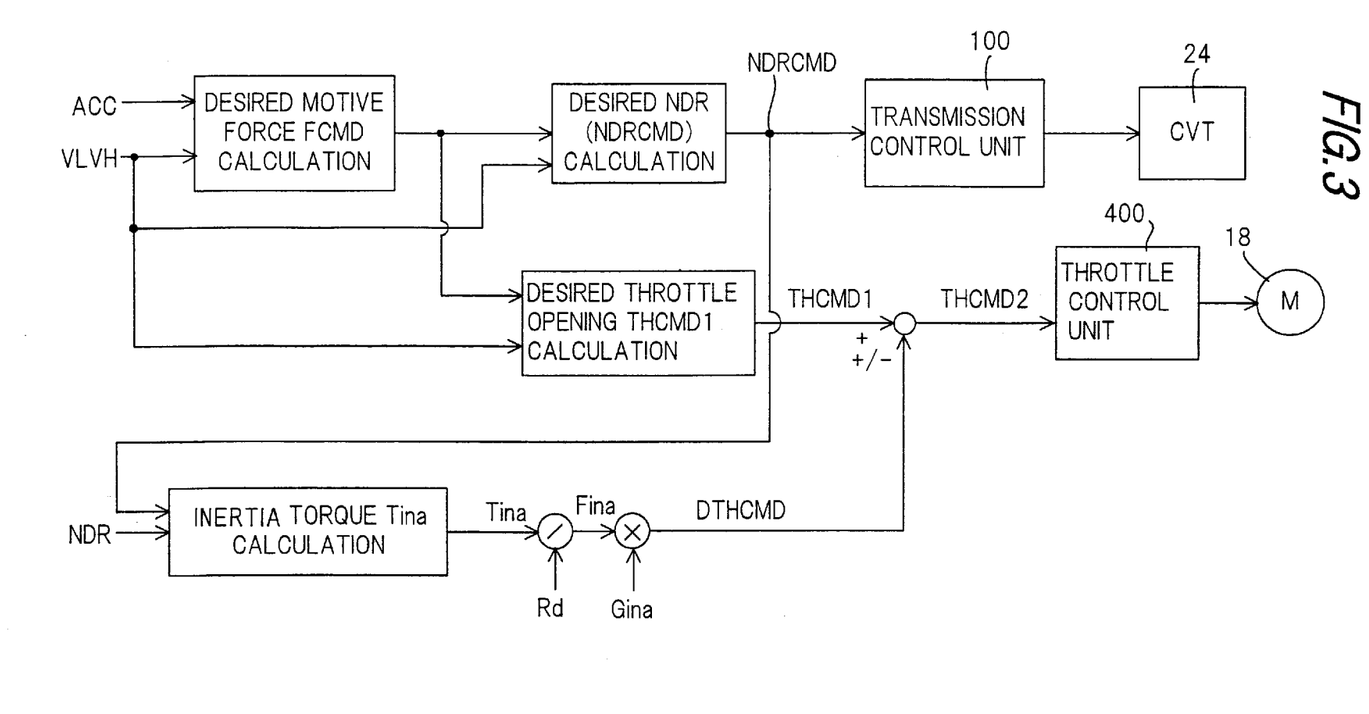
FIG. 3 is a block diagram showing the processing illustrated in the flow chart of FIG. 2 in a functional manner.

FIG. 2 is a flow chart showing the operation of the system and FIG. 3 is a block diagram showing the operation in a functional manner.

As mentioned above, the system is equipped with the CVT (belt-drive continuously variable transmission) 24 as the automatic transmission. Since such a kind of automatic transmission can regulate the gear (speed) ratio continuously, the system can select the engine speed optimum for the vehicle running condition, enabling great improvement of the fuel economy performance.

Specifically, the system has the throttle valve 14, which may be controlled independently of the position of the accelerator pedal 16 such that the system determines a desired motive force to be generated by the vehicle and, based on the determined desired motive force, determines the desired throttle opening and the gear (speed) ratio so as to optimize fuel economy, i.e., to minimize fuel consumption, as will be explained later.

It will be best, in terms of optimizing fuel economy, that the engine speed converges to a desired value as quickly as possible to achieve the desired motive force all the time under both the steady-state and the transient condition. However, the generated motive force lags behind the desired value due to the influence of the inertia torque or moment of the engine 10, the transmission 24 and the vehicle body, etc.

Figure 8:
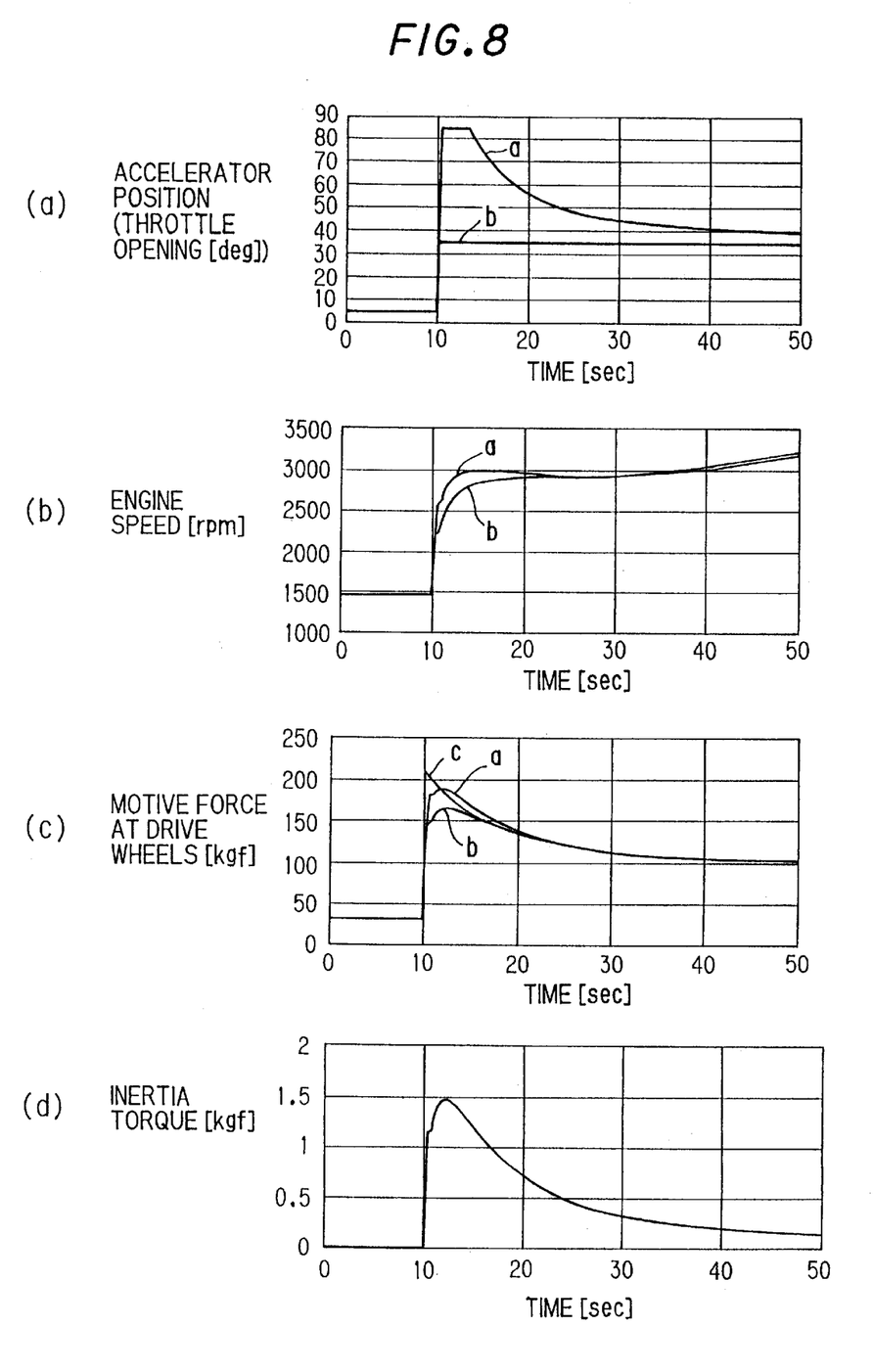
FIG. 8(a) to (d) are explanatory graphs showing the operation of and advantages resulting in the system illustrated in FIG. 1.

Explaining this with reference to FIG. 8, assume that the operator depresses the accelerator pedal 16 to accelerate, as shown by a in FIG. 8(*a*). The engine speed rises drastically as shown by a in FIG. 8(*b*). As shown in FIG. 8(*c*), the motive force (more precisely the motive force at the drive wheels referred to herein as "Fina" and marked by b in the figure) is temporarily absorbed or consumed to increase the inertia of the rotating members in the engine 10 and the transmission 24 and the vehicle body and hence, is less than the desired motive force c in FIG. 8 (*c*).

When the operator releases the accelerator pedal, which has been depressed, to decelerate, the engine speed drops. Since, however, the inertia moment does not decrease quickly, the generated motive force is greater than desired.

The response delay not only affects the fuel economy performance, but also degrades drivability.

Conceivably, the inertia torque that grows after the engine speed increase could be suppressed by retarding the ignition timing in the engine control to temporarily decrease the engine torque. The retarding of ignition timing should, however, be limited to a short period so as not to harm the exhaust purification system (catalyst). This procedure can adjust the inertia torque by a slight amount.

As mentioned above, Japanese Laid-Open Patent Application No. Sho 63(1988)-232,043 teaches controlling the gear ratio on the basis of predetermined characteristics satisfying an improvement of fuel economy, and if the accelerator pedal is depressed to accelerate controlling the gear ratio without using the characteristics to determine a desired engine speed, thereby achieving smooth acceleration so as to faithfully meet the operator's desire. The prior art disregards fuel economy when the vehicle is to accelerate, degrading fuel economy performance.

The prior art described in Japanese Patent Publication No. Hei 6(1994)-65,529 and Japanese Laid-Open Patent Application No. Hei 6(1994)-129,273 limits the engine torque, not for improving fuel economy performance, but for reducing shock generated during gear shifting, and teaches nothing regarding adjustments for the response delay due to the inertia torque so as to enhance fuel economy performance and drivability during vehicle acceleration or deceleration.

In order to solve the problem, the system according present invention is provided with the CVT 24 which can achieve the tractive force desired by the operator, i.e., the desired motive force, by selecting one from among various combinations of engine output torque and speed (gear) ratio. When configured this way, once the vehicle speed is determined, the engine speed relative to the speed (gear) ratio can solely be determined.

Moreover, after the speed (gear) ratio and the engine speed have been determined, the engine output necessary to attain the desired motive force can be calculated by taking into account the efficiency of the CVT 24 (and the additional torque consumed by devices such as an air conditioner, if any).

With this, it becomes possible to determine at least one combination of throttle opening and speed (gear) ratio which satisfies the desired motive force and minimizes fuel consumption.

It should be noted here that, since the engine 10 and the CVT 24 are directly connected, the drive shaft speed NDR (the input shaft rotational speed, i.e., the rotational speed of the drive-side movable pulley 34 of the transmission 24) can be used as a parameter indicative of the engine speed NE. (If the engine is connected with the automatic transmission through a torque converter, it suffices to determine the engine speed if the rotational speed NDR is multiplied by the gear (speed) ratio including the ratio between the input and output rotational speeds of the torque converter.)

At the same time, the value NDR is again used to express the manipulated variable to be supplied to the CVT 24, more specifically to the desired speed (gear) ratio, and is used in the transmission control unit 100. The transmission control unit 100 drives the movable pulleys 34, 46 as explained earlier to control the speed (gear) ratio such that the input rotational speed converges to the desired NDR.

Based on the above, the operation of the system is explained with reference to the flow chart of FIG. 2. The illustrated program is executed by the integrated control unit 300 at prescribed intervals, e.g., once every 20 msec.

The vehicle speed VLVH detected by the vehicle speed sensor 122 is read in S10, then the accelerator (pedal) position ACC detected by the accelerator position sensor 110 is read in S12.

Next, in S14 of FIG. 2, the desired motive force FCMD is calculated or determined.

Figure 4:
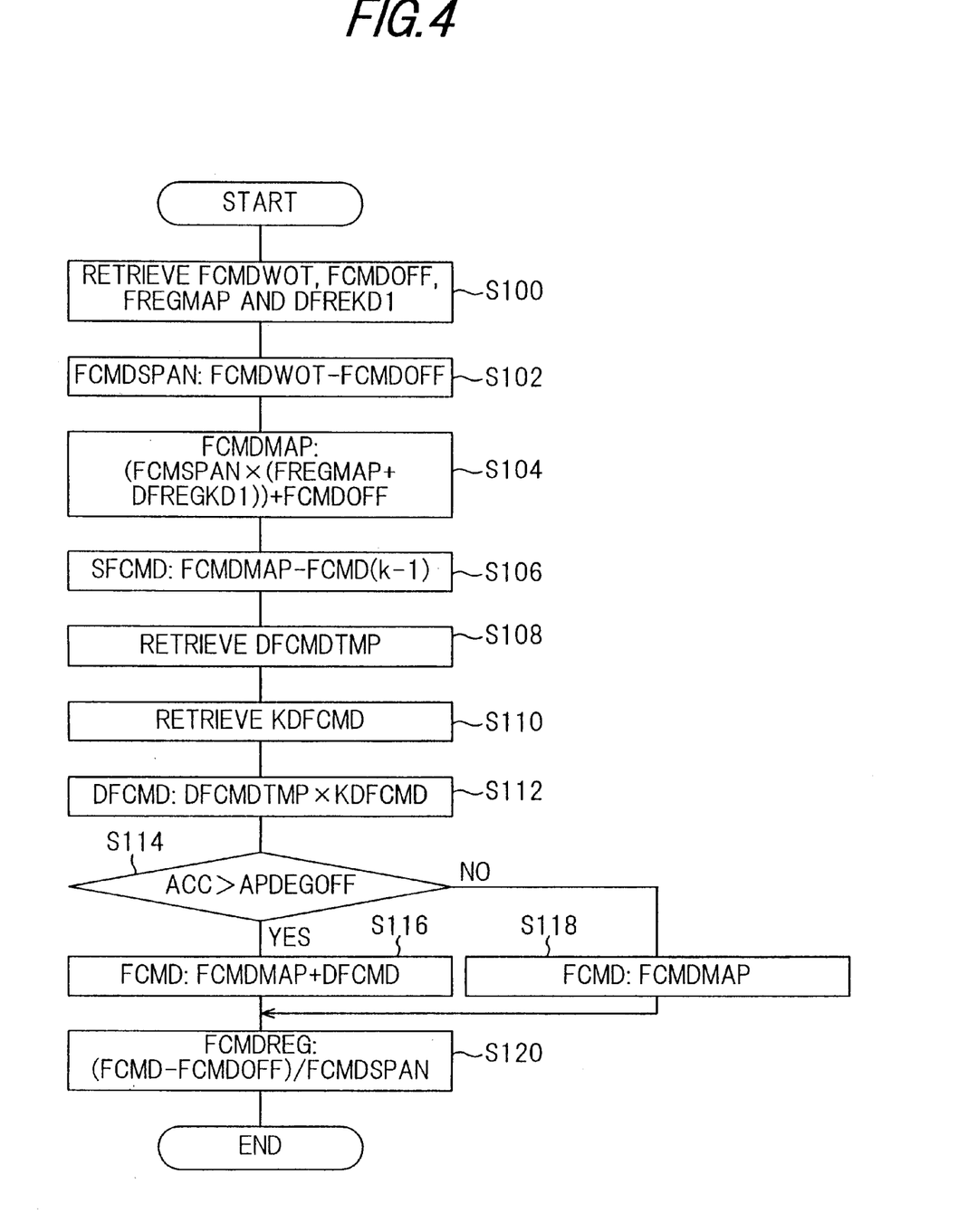
FIG. 4 is a flow chart showing the desired motive force calculation referred to in the flow chart of FIG. 2.
Figure 5:
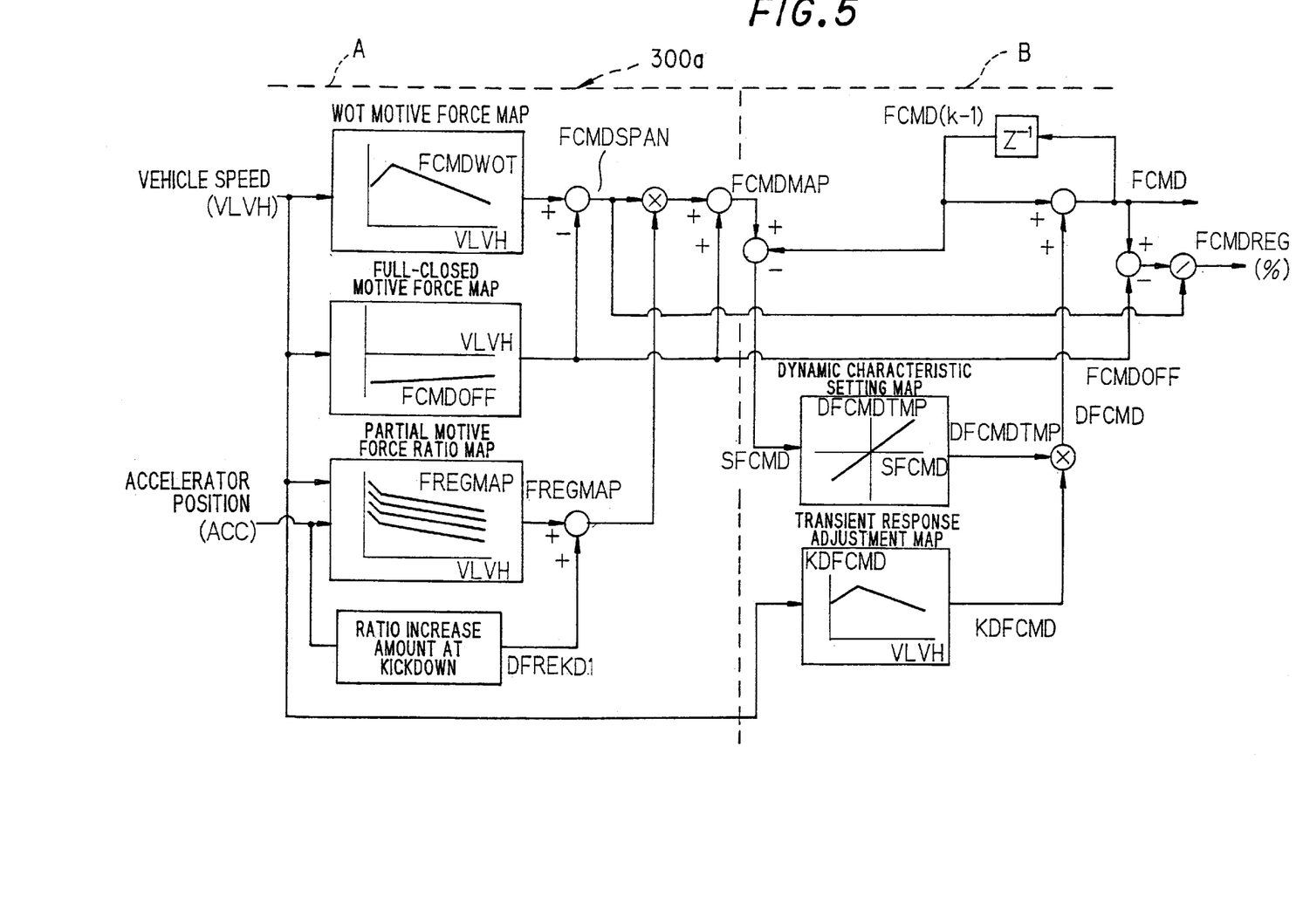
FIG. 5 is a block diagram showing the processing illustrated in the flow chart of FIG. 4 in a functional manner.

FIG. 4 is a flow chart showing the subroutine for this, and FIG. 5 is a block diagram explaining the processing by the subroutine of FIG. 4.

As illustrated, a desired motive force determining section 300*a* is composed of a steady-state motive force computing section A and a dynamic characteristic computing section B.

In S100 of FIG. 4, the read vehicle speed VLVH and accelerator (pedal) position ACC are used as address data to retrieve the motive force at WOT (wide-open-throttle) FCMDWOT (kgf), motive force at full-closed-throttle FCMDOFF (kgf), a partial motive force ratio (normalized desired motive force) FREGMAP (%) and a ratio increase amount for kickdown DFREKD1 from maps (mapped data), whose characteristics are shown in FIG. 5 (DFREKD1 characteristics not shown).

The motive force at WOT map and the motive force at full-closed-throttle map (respectively referred to in FIG. 5 as WOT Motive Force Map and Full Closed Motive Force Map) define the obtainable maximum motive force FCMDWOT and obtainable minimum motive force FCMDOFF as a function of vehicle speed VLVH. The partial motive force ratio (normalized desired motive force) map defines the ratio of motive force, normalized between the maximum and minimum motive forces, as a function of accelerator position ACC for different vehicle speeds VLVH.

When the rate of accelerator pedal depression is great, i.e., when accelerator position change rate ΔACC (first-order difference of accelerator position ACC) is large, the accelerator position change rate ΔACC is used as address data to retrieve the ratio increase amount for kickdown DFREKD1 corresponding to a kickdown operation from a map (not shown). This is because rapid depression of the accelerator pedal can be assumed to mean that the operator wants a sudden increase in motive force.

Next, in S102, the full-closed-throttle motive force FCMDOFF is subtracted from the WOT motive force FCMDWOT to obtain the difference FCMDSPAN. A desired steady-state driving force FCMDMAP is then calculated in S104 by multiplying the calculated difference FCMDSPAN by the sum of the partial motive force ratio FREGMAP and the ratio increase amount for kickdown DFREKD1 and adding the full-closed-throttle motive force FCMDOFF to the product.

Next, in S106, FCMD(k-1), i.e., the value of FCMD in the preceding cycle, is subtracted from the calculated value of FCMDMAP to obtain the difference (error) SFCMD. The notation (k-1) here indicates that the value is that in Z transformation at the discrete sample number in the preceding circle, more specifically that it is the value at the time of execution of the program of FIG. 2 in the preceding cycle. (In the interest of simpler notation, (k) is not affixed to current cycle values.)

In the following step S108, the calculated difference SFCMD is used as address data to retrieve the value DFCMDTMP from a dynamic characteristic setting map (whose characteristics are shown in FIG. 5). This dynamic characteristic setting map defines a desired motive force response adjustment term DFCMDTMP as a function of the difference SFCMD between preceding cycle desired motive force FCMD (k-1) and current cycle desired motive force FCMD.

Next, in S110, the vehicle speed VLVH is used as address data to retrieve a value KDFCMD from a transient response adjustment map (whose characteristics are shown in FIG. 5). This transient response adjustment map defines a correction coefficient KDFCMD for the desired motive force response adjustment term DFCMDTMP as a function of the vehicle speed. Then, in S112, a desired motive force response adjustment term DFCMD is calculated by multiplying the retrieved values DFCMDTMP and KDFCMD.

Next, in S114, it is checked whether the detected accelerator position ACC is greater than a prescribed value APDEGOFF (corresponding to the full-closed-throttle position). In other words, a check is made to see whether the accelerator pedal is in a position other than a substantially not-depressed position. When the result is YES, the sum of FCMDMAP and DFCMD (i.e., value after dynamic characteristic adjustment) is determined as the desired motive force FCMD in S116. When the result is NO, FCMDMAP (i.e., the value before dynamic characteristic adjustment) is determined as the desired motive force FCMD in S118.

Then, in S120, FCMDOFF and FCMDSPAN are used to modify the desired motive force FCMD after dynamic characteristic adjustment to a normalized amount FCMDREG (%) and the subroutine is terminated.

As will be understood from the foregoing, the motive force characteristics mapped as a function of the vehicle speed and accelerator pedal position are those of the normalized desired motive force. The reason for this is that defining the map in terms of the actual motive force with the map grid nodes established based on the maximum motive force would make the retrieval resolution coarse on the minimum motive force side because the maximum motive force the vehicle can achieve is high at low vehicle speeds and low at high speeds. The desired motive force is therefore normalized over the full range. By this the resolution of the output relative to the accelerator (pedal) position is made uniform at all vehicle speeds.

Moreover, as illustrated in FIG. 5, the desired motive force determining section is established as discrete units A, B, wherein A refers to the steady-state motive force computing section, and B to the dynamic characteristic computing section. The reason for this will next be explained.

When the change rate of the desired motive force is excessively large, the engine torque response and the rate of transmission speed (gear) ratio change may not be able to keep up. Cases may therefore arise in which the requirements of the determined characteristic cannot be satisfied. Conceivably, such a situation can be handled by calculating the actual motive force for the desired motive force and effecting feedback control by engine torque correction. However, this complicates the system configuration.

Another problem with this approach is that it alters the preset relationship between the engine torque and the speed (gear) ratio and by this shifts the engine operating point away from that of optimum fuel economy. Moreover, since what the operator actually wants is not a sudden step-like change in motive force, better response to the operator's desire and improved drivability can be achieved by gradually responding to the requested output under steady-state.

Therefore, as shown in FIG. 5, the steady-state motive force computing section A and the dynamic characteristic computing section B are separately configured and the rate of desired motive force change is limited by having the steady-state motive force computing section A compute that part of the requested (desired) motive force desired to be attained along a steady-state characteristics curve at the given accelerator pedal position and vehicle speed, and having the dynamic characteristic computing section B compute the transient curve portion defining how the response will effect such motive force.

In other words, the dynamic characteristic computing section B takes into account the response of the engine and transmission and computes the desired motive force by correcting the steady-state motive force requested by the steady-state motive force computing section A so as to satisfy the dynamic characteristic of the motive force. By this configuration, control can be achieved that constantly tracks the combination of engine torque and speed (gear) ratio providing optimum fuel economy while maintaining good drivability.

Further, when the accelerator pedal is in a position corresponding to full-closed-throttle position, intention to decelerate is promptly ascertained since only the steady-state characteristic portion of the desired motive force is utilized, while when the accelerator pedal position is not full-closed, the transient response characteristic is adjusted for the vehicle speed. The vehicle motive force characteristics can therefore be freely set with a simply configured system.

Returning to the explanation of FIG. 2, the desired NDR (NDRCMD) is calculated in S16. This is done by retrieving a map (mapped data, whose characteristics are shown in FIG. 6) by the vehicle speed VLVH and the normalized value FCMDREG of the desired motive force FCMD.

Next, the desired throttle opening THCMD1 is calculated in S18. This is similarly done by retrieving a map (mapped data, whose characteristics are shown in FIG. 7) by the vehicle speed VLVH and the normalized value FCMDREG of the desired motive force FCMD.

Figure 6:
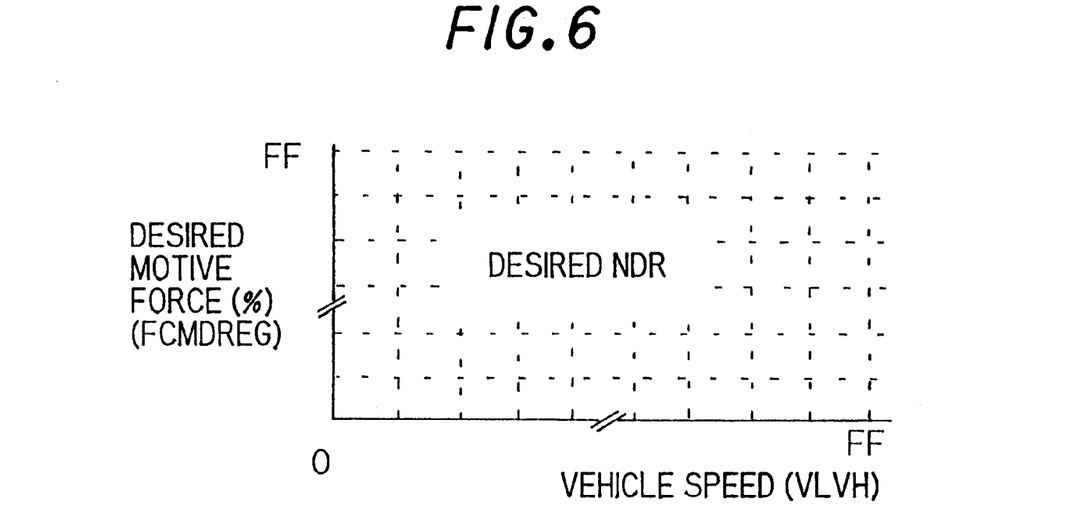
FIG. 6 is an explanatory graph showing the characteristics of a map to be used for a desired NDR calculation referred to in the flow chart of FIG. 2.
Figure 7:
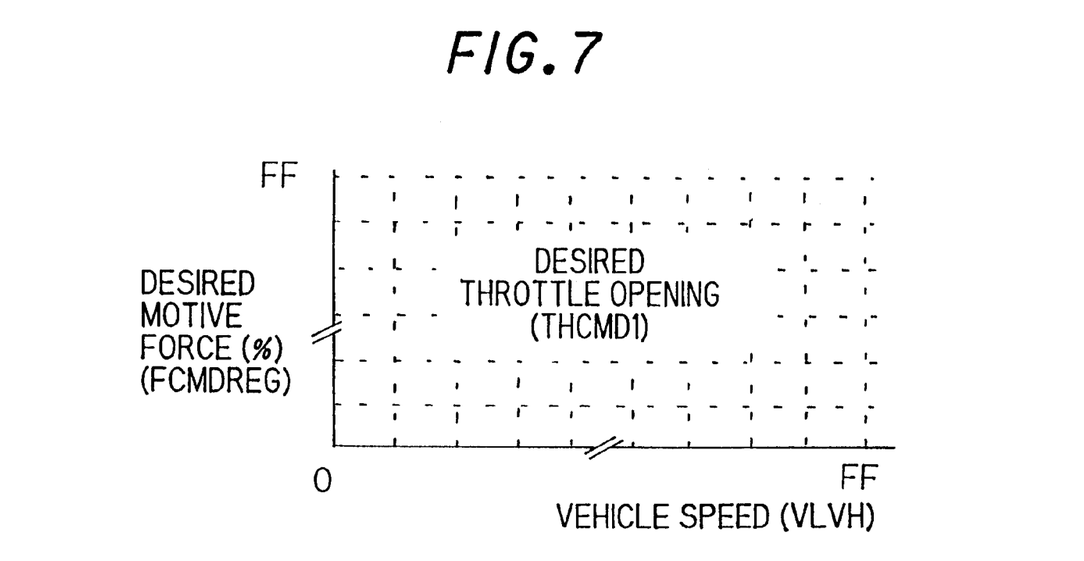
FIG. 7 is an explanatory graph showing the characteristics of a map to be used for a desired throttle opening referred to in the flow chart of FIG. 2.

It should be noted here that combinations of the desired NDR (NDRCMD) and the desired throttle opening THCMD1 which achieve the desired motive force at minimum fuel consumption (optimum fuel economy) are prepared beforehand through experimentation and stored in memory as the maps shown in FIGS. 6 and 7.

Next, the actual NDR (corresponding to the actual engine speed) detected by the speed sensor 114 is read, and an inertia-correction amount (amount correcting for the desired throttle opening THCMD1 from the inertia torque) DTHCMD is calculated in S22.

The inertia-correction amount DTHCMD is calculated based on the speed (gear) ratio (i.e., the ratio between the drive shaft rotational speed NDR and the driven shaft rotational speed NDN), the desired NDR (NDRCMD) and the detected NDR, etc. Since the engine speed NE and the drive shaft rotational speed NDR is almost the same, an inertia torque Tina is calculated based on the speed ratio and the desired and detected NDRs. The calculated value Tina is then converted to the motive at the drive wheels Fina (motive force corresponding to the inertia torque) which is used as the correction amount for correcting the desired throttle opening DTHCMD.

The inertial torque Tina is calculated as follows:

$$Tina = \{(Ie+Idr) \times iF^2 \times iR^2 + Idn \times iF^2 + If + Iw + Ic\} \times (dw/dt)$$

Here, Ie: inertia acting at the members rotating with the engine output shaft 20 (such as crankshafts, piston flywheels); Idr: inertia acting at the members rotating with the transmission input shaft 28 (such as the driven-side movable pulley 34, the forward clutch 76); Idn: inertia acting at the members rotating with the gear 78 (such as the driven-side movable pulley 46, the start clutch 42, the gear 78); If: inertia acting at the final gear-reduced input shaft (i.e, the member rotating with the counter-shaft 30 (such as gears 80, 82, 84 and the differential 40); Iw: inertial acting at the member rotating with the vehicle wheels such as tires, wheels, brake disks, axle shafts); Ic: inertia acting at the vehicle body and converted that at the axles; iF: overall gear-reduction ratio; iR: pulley speed ratio (calculated from the rotational speeds NDR, NDN).

The value dw/dt is calculated as follows:

$$dw/dt = \{(NDRCMD-NDR) \times 2\pi\}/(\Delta t \times 60)$$

Then, using the calculated inertia torque Tina, the motive force corresponding to the inertia torque Fina is calculated as follows:

$$Fina = Tina/Rd \text{ (where } Rd\text{:tire radius)}$$

Then the calculated force Fina is multiplied by a coefficient Gina to calculate the inertia-correction amount DTHCMD as follows:

$$DTHCMD = Fina \times Gina$$

In the flow chart of FIG. 2, it is determined in S24 whether the vehicle is accelerating. This is done by, for example, calculating a first-order difference between the detected throttle opening θTH obtained in the current program loop and that obtained in the previous program loop and by comparing it with a reference value.

When the result in S24 is YES, the inertia-correction amount DTHCMD is added to the desired throttle opening THCMD1 to correct (increase) the same in S26. On the other hand, when the result in S24 is NO, it is determined in a similar manner in S28 whether the vehicle is decelerating, and if the result is YES the inertia-correction amount DTHCMD is subtracted from the desired throttle opening THCMD1 to correct (decrease) the same in S30. The corrected desired throttle opening is renamed as THCMD2. When the result in S28 is NO, step S30 is skipped.

Next, the corrected desired throttle opening THCMD2 (or the desired throttle opening THCMD1, if not corrected) and the desired NDR (NDRCMD) are output to the throttle control unit 400 and the transmission control unit 100.

The throttle control unit 400 determines and outputs a manipulated variable to the stepper motor 18 to effect the desired throttle opening, more generally the desired engine output.

The transmission control unit 100 controls the speed ratio to effect the desired NDR. Specifically, the transmission control unit 100 drives the movable pulleys 34, 46 as explained earlier to control the speed (gear) ratio such that the input rotational speed converges to the desired NDR. The desired NDR is the desired rotational speed of the drive-side movable pulley 34 of the transmission 24 and the speed (gear) ratio is uniquely determined and controlled by defining the desired NDR relative to the vehicle speed VLVH.

Thus, the throttle valve 16 is controlled to compensate the inertia torque at the engine 10. More specifically, the throttle valve 16 is controlled to open by an amount to generate an engine torque corresponding to the amount absorbed by the engine speed increase when the actual engine speed is lower than the desired engine speed at the initial stage of acceleration such that the actual engine speed converges to the desired engine speed quickly.

The result of the above is that the actual motive force follows the desired motive force faithfully, in other words that the engine follows the minimum fuel consumption operation line faithfully. On the other hand, when the depressed accelerator pedal is released and if the actual engine speed is above the desired engine speed, the throttle valve 16 is controlled to close to decrease the surplus torque, causing the actual engine speed to reach the desired engine speed quickly.

Explaining the above with reference to FIG. 8, the system is configured to correct the accelerator position (more precisely throttle opening) b as a in FIG. 8(a) based on the determined inertia torque shown in FIG. 8(d), and to correct the engine speed b as a in FIG. 8(b). As a result, as shown in FIG. 8(c), the actual motive force a follows the desired motive force c.

The embodiment is configured to have a system for controlling motive force of a vehicle having an engine (10) and an automatic transmission (continuously variable transmission (CVT) 24) connected to the engine to transmit engine torque to a drive shaft of the vehicle, comprising: operating condition detecting means (accelerator position sensor 110, vehicle speed sensor 122, the speed sensor 114, S10, S12, S20) for detecting operating conditions of the vehicle including at least an accelerator position (ACC) and a vehicle speed (VLVH), and operating conditions of the engine including at least an engine speed (NE, actual NDR); desired motive force determining means (S14) for determining a desired motive force to be generated by the vehicle (FCMD (FCMDREG)) based at least on the detected accelerator position and vehicle speed; desired output calculating means (S18, S16) for calculating a desired output of the engine (desired throttle opening THCMD1 (THCMD2)) and a manipulated variable to be supplied to the automatic transmission (desired NDR (NDRCMD)) to achieve the determined desired motive force so as to minimize fuel consumption; desired engine speed calculating means (S16) for calculating a desired engine speed (desired NDR) based on at least the calculated manipulated variable to be supplied to the automatic transmission; inertia torque calculating means (S22) for calculating an inertia torque (inertia-correction amount DTHCMD) acting on the vehicle based at least on the calculated desired engine speed (NDRCMD), the detected engine speed (actual NDR) and the manipulated variable to be supplied to the automatic transmission (NDR/NOUT); engine output correcting means (S24 to S30) for correcting the calculated desired output of the engine (as THCMD2=THCMD1±DTH CMD) based on at least the calculated inertia torque (inertia-correction amount DTHCMD); actuator control means (S32) for controlling operation of an actuator (stepper motor 18) which regulates the output of the engine in response to the corrected desired output of the engine; and shift control means (S32) for controlling a gear ratio of the automatic transmission in response to the calculated manipulated variable to be supplied to the automatic transmission (NDR/NOUT).

In the system, the engine output correcting means includes:transient discriminating means (S24, S28) for discriminating whether the vehicle accelerates or decelerates; and corrects the calculated desired output of the engine when the vehicle is discriminated to accelerate or decelerate (S26, S30).

In the system, the engine output correcting means increases the calculated engine output when the vehicle is discriminated to accelerate (S26) and decreases the calculated engine output when the vehicle is discriminated to decelerate (S30).

In the system, the engine output correcting means corrects the calculated desired engine output by correcting a throttle opening of the engine (S26, S30).

In the system, the automatic transmission is a continuous variable transmission (CVT 24).

In the system, the desired motive force determining mean includes: wide-open-throttle motive force calculating means (S14, S100) for calculating a wide-open-throttle motive force generated based at least on the detected vehicle speed when a throttle valve of the engine is fully opened (FCMDWOT); full-closed-throttle motive force calculating means (S14, S100) for calculating a full-closed-throttle motive force generated based at least on the detected vehicle speed when a throttle valve of the engine is fully closed (FCMDOFF); motive force ratio calculating means (S14, S100) for calculating a ratio of motive force at the detected vehicle speed relative to the detected accelerator position (FREGMAP); and desired motive force calculating means (S14, S102 to S120) for calculating the desired motive force (FCMD (FCMDREG)) by obtaining a difference between the wide-open-throttle motive force and the full-closed-throttle motive force and by multiplying the difference by the calculated ratio of motive force.

In the system, the desired motive force determining means further includes: error calculating means (S14, S106) for calculating an error between the desired motive force calculated currently (FCMDMAP) and that calculated previously (FCMD(k-1)); and desired motive force correcting means (S14, S108 to S120) for correcting the currently calculated desired motive force (FCMDMAP) by the calculated error.

Having been configured in the foregoing manner, the vehicle motive force control system according to the invention calculates the overall inertia torque acting on the vehicle during the steady-state and the transient conditions and controls the throttle valve 16 to correct the engine torque to adjust for the surplus motive force caused by inertia at vehicle acceleration or the insufficient motive force caused by inertia at vehicle deceleration. With this arrangement, the engine speed tracks the desired value faithfully to effect the desired motive force (which secures optimum fuel economy), thereby improving the drivability and fuel economy performance.

Moreover, the absolute value of the maximum motive force that a vehicle can produce generally decreases with increasing vehicle speed. In the system according to the invention, however, since the desired motive force is normalized between the maximum value and the minimum value and the normalized values are used for map retrieval, the system enables improved retrieval resolution of the desired engine torque and speed (gear) ratio over the entire range from the lowest to the highest vehicle speed.

Since the desired motive force is calculated using a steady-state characteristic portion and a transient characteristic portion, the motive force can be determined appropriately.

The desired motive force need not be determined by retrieval from a map prepared beforehand as in the foregoing embodiment but can instead be determined by calculation.

Further, the desired engine output is expressed as throttle valve opening in the foregoing embodiment but some other value such as amount of fuel consumption or intake air quantity can be adopted instead. The transmission manipulated variable is expressed as NDR (input speed) in the foregoing embodiment but the speed (gear) ratio or its change rate can be adopted instead.

The foregoing embodiment varies the engine output by varying the desired throttle opening of an electronically controlled throttle valve. The invention is not limited to this configuration, however, and can instead vary the engine output by the method adopted in some recently developed direct-fuel-injection engines and diesel engines of mapping the desired engine torque and controlling the quantity of fuel injection or the desired air/fuel ratio according to the torque.

Although the foregoing description was made with reference to an example using a continuously variable transmission of the metal belt type, the invention can also be effectively applied to one of the rubber belt type or toroidal type. The system can not only be configured to utilize a continuously variable transmission but also may be configured to select the optimum gear of a multi-step transmission. The slip rate of a lockup clutch can be utilized instead. More specifically, the gear shift, the motive force difference resulting from the lockup clutch ON/OFF operation, the WOT enrichment avoidance region, and the fuel economy at WOT can be taken into account, solely or in combination, to determine the engine control region, gear shift and lockup clutch capacitor limit value, etc.

The transmission structure is not limited to that illustrated. A torque converter can be connected to the output shaft 20 of the engine 10 and a torque converter can be used in place of the start clutch 42. The dual-mass flywheel 26 can be eliminated.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling motive force of a vehicle having an engine and an automatic transmission connected to the engine to transmit engine torque to a drive shaft of the vehicle, comprising:

operating condition detecting means for detecting operating conditions of the vehicle including at least an accelerator position and a vehicle speed, and operating conditions of the engine including at least an engine speed;

desired motive force determining means for determining a desired motive force to be generated by the vehicle based at least on the detected accelerator position and vehicle speed;

desired output calculating means for calculating a desired output of the engine and a manipulated variable to be supplied to the automatic transmission to achieve the determined desired motive force so as to minimize fuel consumption;

desired engine speed calculating means for calculating a desired engine speed based on at least the calculated manipulated variable to be supplied to the automatic transmission;

inertia torque calculating means for calculating an inertia torque acting on the vehicle based at least on the calculated desired engine speed, the detected engine speed and the manipulated variable to be supplied to the automatic transmission;

engine output correcting means for correcting the calculated desired output of the engine based on at least the calculated inertia torque;

actuator control means for controlling operation of an actuator which regulates the output of the engine in response to the corrected desired output of the engine; and shift control means for controlling a gear ratio of the automatic transmission in response to the calculated manipulated variable to be supplied to the automatic transmission.

2. A system according to claim 1, wherein the engine output correcting means includes:

transient discriminating means for discriminating whether the vehicle accelerates or decelerates;

and corrects the calculated desired output of the engine when the vehicle is discriminated to accelerate or decelerate.

3. A system according to claim 2, wherein the engine output correcting means increases the calculated engine output when the vehicle is discriminated to accelerate and decreases the calculated engine output when the vehicle is discriminated to decelerate.

4. A system according to claim 3, wherein the engine output correcting means corrects the calculated desired engine output by correcting a throttle opening of the engine.

5. A system according to claim 1, wherein the automatic transmission is a continuous variable transmission.

6. A system according to claim 1, wherein the desired motive force determining means includes:

wide-open-throttle motive force calculating means for calculating a wide-open-throttle motive force generated based at least on the detected vehicle speed when a throttle valve of the engine is fully opened;

full-closed-throttle motive force calculating means for calculating a full-closed-throttle motive force generated based at least on the detected vehicle speed when a throttle valve of the engine is fully closed;

motive force ratio calculating means for calculating a ratio of motive force at the detected vehicle speed relative to the detected accelerator position; and desired motive force calculating means for calculating the desired motive force by obtaining a difference between the wide-open-throttle motive force and the full-closed-throttle motive force and by multiplying the difference by the calculated ratio of motive force.

7. A system according to claim 3, wherein the desired motive force determining means further includes:

error calculating means for calculating an error between the desired motive force calculated currently and that calculated previously; and desired motive force correcting means for correcting the currently calculated desired motive force by the calculated error.

8. A method of controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine speed;

determining a desired motive force to be generated by the vehicle based at least on the detected accelerator position and vehicle speed;

calculating a desired output of the engine and a manipulated variable to be supplied to the automatic transmission to achieve the determined desired motive force so as to minimize fuel consumption;

calculating a desired engine speed based on at least the calculated manipulated variable to be supplied to the automatic transmission;

calculating an inertia torque acting on the vehicle based at least on the calculated desired engine speed, the detected engine speed and the manipulated variable to be supplied to the automatic transmission;

correcting the calculated desired output of the engine based on at least the calculated inertia torque;

controlling operation of an actuator which regulates the output of the engine in response to the corrected desired output of the engine; and controlling a gear ratio of the automatic transmission in response to the calculated manipulated variable to be supplied to the automatic transmission.

9. A method according to claim 8, wherein the step of engine output correction includes:

discriminating whether the vehicle accelerates or decelerates; and correcting the calculated desired output of the engine when the vehicle is discriminated to accelerate or decelerate.

10. A method according to claim 9, wherein the calculated engine output is increased when the vehicle is discriminated to accelerate and decreased the calculated engine output when the vehicle is discriminated to decelerate.

11. A method according to claim 10, wherein the calculated desired engine output is corrected by correcting a throttle opening of the engine.

12. A method according to claim 8, wherein the automatic transmission is a continuous variable transmission.

13. A method according to claim 8, wherein the step of desired motive force determination includes the steps of:

calculating a wide-open-throttle motive force generated based at least on the detected vehicle speed when a throttle valve of the engine is fully opened;

calculating a full-closed-throttle motive force generated based at least on the detected vehicle speed when a throttle valve of the engine is fully closed;

calculating a ratio of motive force at the detected vehicle speed relative to the detected accelerator position; and calculating the desired motive force by obtaining a difference between the wide-open-throttle motive force and the full-closed-throttle motive force and by multiplying the difference by the calculated ratio of motive force.

14. A method according to claim 10, wherein the step of desired motive force determination further includes the steps of:

calculating an error between the desired motive force calculated currently and that calculated previously; and correcting the currently calculated desired motive force by the calculated error.

15. A computer program embodied on a computer-readable medium for controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine speed;

determining a desired motive force to be generated by the vehicle based at least on the detected accelerator position and vehicle speed;

calculating a desired output of the engine and a manipulated variable to be supplied to the automatic transmission to achieve the determined desired motive force so as to minimize fuel consumption;

calculating a desired engine speed based on at least the calculated manipulated variable to be supplied to the automatic transmission;

calculating an inertia torque acting on the vehicle based at least on the calculated desired engine speed, the detected engine speed and the manipulated variable to be supplied to the automatic transmission;

correcting the calculated desired output of the engine based on at least the calculated inertia torque;

controlling operation of an actuator which regulates the output of the engine in response to the corrected desired output of the engine; and controlling a gear ratio of the automatic transmission in response to the calculated manipulated variable to be supplied to the automatic transmission.

* * * * *